(12) United States Patent
Goodyear

(10) Patent No.: US 6,311,041 B1
(45) Date of Patent: Oct. 30, 2001

(54) MULTI-MEDIA NETWORK-BASED COMMUNICATION SYSTEM AND METHOD FOR TRAINING SPORTS OFFICIALS

(76) Inventor: Christopher J. Goodyear, 120 S. Pineview Pl., Chandler, AZ (US) 85226

( * ) Notice: Subject to any disclaimer, the term of this patent is extended or adjusted under 35 U.S.C. 154(b) by 0 days.

(21) Appl. No.: 09/515,828

(22) Filed: Feb. 29, 2000

(51) Int. Cl.[7] .................................................. G09B 3/00
(52) U.S. Cl. ...................... 434/350; 434/247; 434/307 R
(58) Field of Search ................ 434/219, 307 R, 434/308, 247, 322, 323, 350, 362, 365; 463/1, 3, 4, 16, 19, 22, 29, 40–42; 273/139, 236, 237, 242, 259, 269, 284, 287, 460; 472/89–92; 482/902; 345/156, 634; 342/41, 386, 456; 379/92.03, 93.13; 370/260–262; 473/415, 454, 471, 499; 455/2.01; 705/14, 219; 707/102, 501.1, 513, 517; 709/202–205, 220, 225–227; 711/160, 171; 717/11

(56) References Cited

U.S. PATENT DOCUMENTS

| | | | |
|---|---|---|---|
| 3,938,804 | * | 2/1976 | Willett .................................. 473/499 |
| 4,569,526 | * | 2/1986 | Hamilton .............................. 273/242 |
| 5,018,736 | * | 5/1991 | Pearson et al. ........................ 463/29 |
| 5,191,341 | * | 3/1993 | Gouard et al. ........................ 342/456 |
| 5,347,632 | | 9/1994 | Filepp et al. . |
| 5,350,172 | * | 9/1994 | Garrett et al. ........................ 473/454 |
| 5,442,771 | | 8/1995 | Filepp et al. . |
| 5,683,090 | * | 11/1997 | Zeile et al. ............................ 273/269 |
| 5,689,799 | * | 11/1997 | Dougherty et al. ................. 455/2.01 |
| 5,740,549 | | 4/1998 | Reilly et al. . |
| 5,841,976 | | 11/1998 | Tai et al. . |
| 5,862,330 | | 1/1999 | Anupam et al. . |
| 5,890,906 | * | 4/1999 | Macri et al. .......................... 434/247 |
| 5,971,854 | * | 10/1999 | Pearson et al. ......................... 463/41 |
| 5,974,446 | | 10/1999 | Sonnenreich et al. . |
| 5,993,335 | * | 11/1999 | Eden et al. ........................... 473/471 |
| 6,093,109 | * | 7/2000 | Eden et al. ............................. 472/92 |
| 6,164,973 | * | 12/2000 | Macri et al. .......................... 434/247 |
| 6,226,648 | * | 5/2001 | Appleman et al. .................. 707/102 |

* cited by examiner

Primary Examiner—Joe H. Cheng
(74) Attorney, Agent, or Firm—Quarles & Bradley Streick Lang, LLP; Allen J. Moss; Paul D. Amrozowicz

(57) ABSTRACT

A system and method provide a site on a network accessible to a staff of officials from a sports league to facilitate more consistent and correct officiating of games played under league rules. The site provides links to digitized game segments demonstrative of lessons to be learned from review of the segments. Each digitized game segment is provided with a comment and/or question intended to instruct the reviewing official as to the lesson to be learned from review of the displayed game play. Additionally provided to the officials over the site are periodic tests and rule clarifications intended to further sharpen their officiating skills. Officials that travel between different sports venues in a given week are able to review the site between games for newly posted training-related materials from prior games.

15 Claims, 3 Drawing Sheets

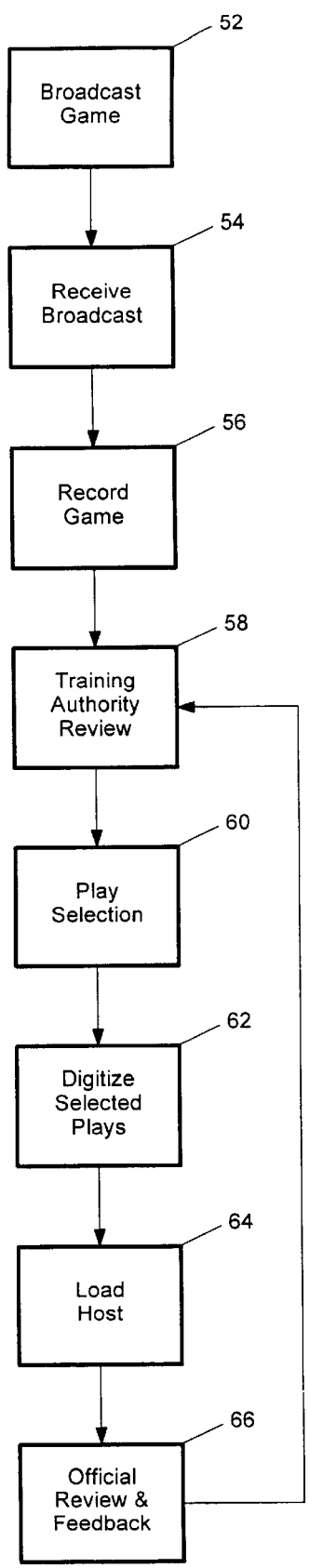
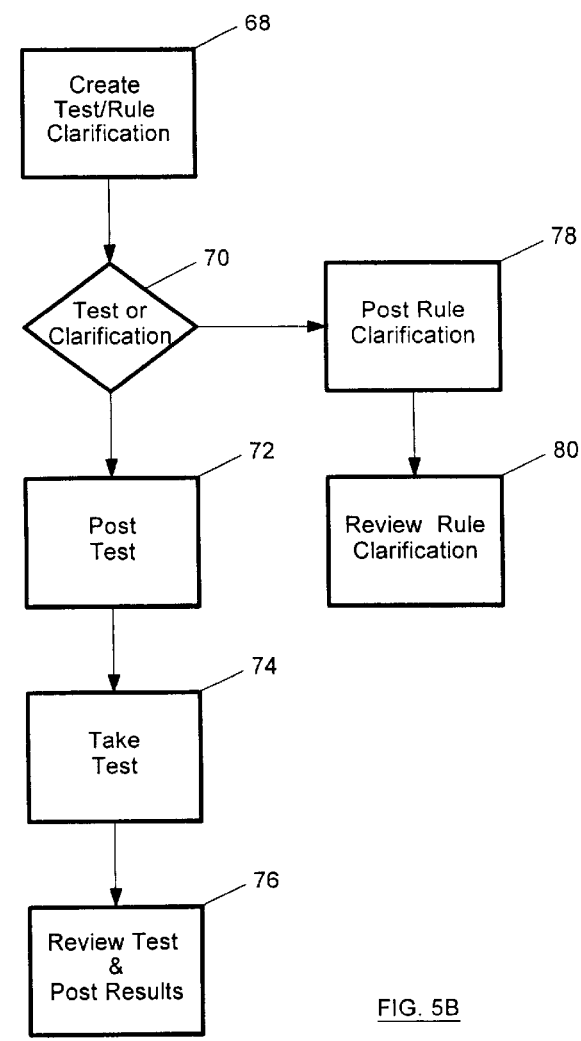
FIG. 5A
FIG. 5B

MULTI-MEDIA NETWORK-BASED COMMUNICATION SYSTEM AND METHOD FOR TRAINING SPORTS OFFICIALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to communication systems and methods, and more particularly, is a multi-media network-based communication system and method primarily for training sports officials.

Quality sports officiating results from having an experienced, well-trained staff of sports officials. One of the primary techniques presently employed to train sports officials involves taping sports games, selecting from the taping instructive plays, and providing video tapes of such plays to the sports officials for review. Plays of instructive value include those where: 1) an official's call was inaccurate; 2) a similar game situation has been dissimilarly officiated; 3) a player in violation of a game rule has discovered a way to avoid having a call made against them; or 4) the subject game situation occurs infrequently or involves resolving complex game rules. Typically, a training authority for a sports league tapes the games, selects the desired plays, and provides the instructional tapes to their field of officials, along with a description of the lessons demonstrated by the accompanying tapes.

This training scheme has several drawbacks, each resulting from the common sports league practice of employing a large field of officials that either live in the different cities having sports venues, or travel around the country (on a weekly basis) to their assigned games. In other words, the intended recipients of the instructional tapes (i.e., the officials) are many, spread out across the country, and frequently, in transit from one city to another to officiate.

As a result, a separate instructional tape must be made for every official in the league. As is commonly the case, there are many league officials, meaning that the cost to purchase tapes is not insignificant. Adding to this is the notion that such training tapes must be prepared and distributed every week during the sports season, to cover the latest officiating pointers from the previous week's games. Moreover, there are considerable added costs to priority ship the tapes on a weekly basis across the country to every official. Aside from the cost issue in preparing and shipping the tapes across the country each week to every official, it has been difficult to successfully coordinate the tape shipments with the officials' hectic travel schedules. Consequently, despite the heavy investment in time and money to prepare and ship the tapes, officials frequently fail to receive the latest tapes in a timely manner, which may impact the quality of their officiating.

Supplementing the tapes in the training effort, the league's training authority frequently sends tests and recent rule clarifications to its staff of officials. Presently, such tests are sent out by priority mail to the officiating staff, and the completed tests are similarly returned to the training authority for evaluation. The scheme in use today to disseminate rule clarifications to the officials involves explanation by way of telephone call or facsimile report. The burdensome cost and coordination issues noted above with respect to the preparation and shipping of training tapes also apply to these latter two training techniques.

Thus, there is a need for a multi-media network-based communication system and method for training sports officials.

BRIEF SUMMARY OF THE INVENTION

The system and method embodying the present invention provide a site on a network accessible to a staff of officials from a sports league to facilitate more consistent and correct officiating of games played under league rules.

From broadcasts of league games, certain game segments are selected as being valuable for training the officials. Such selections are typically made by a training authority for the league. Game segments that are valuable for training officials include those where: 1) an official's call is inaccurate; 2) a similar game situation is dissimilarly officiated; 3) a player in violation of a game rule uses a technique to avoid having an official render a call against them; 4) the subject game situation is one that occurs infrequently or involves resolving complex game rules; or 5) the training authority otherwise determines that the game segment is of training value. The selected game segments are digitized and formatted for posting on the site, such segments being accessible via links on the site to multi-media files for presenting audio-visual or visual-only representations of the selected game segments. Similarly, the training authority selects certain comments and/or questions that are posted with the links to the related digitized game segments. Such comments and/or questions are reviewed by an official to describe, suggest, or evoke a lesson to be learned from their review of a related digitized game segment. Additionally provided to the officials over the site are periodic tests and rule clarifications intended to further sharpen their officiating skills.

This system and method obviates the prior need to periodically send to every official multiple training tapes, tests, and rule clarifications, averting the undesired cost with sending such shipments. Similarly, the previous difficulty in having such shipments reach a staff of on-the-move officials is now overcome, as this approach ensures that the officials will receive newly-posted training materials, regardless of the officials' travel patterns. As a consequence, the officiating of league games will improve in both consistency and accuracy. Additionally, the system and method of the present invention provide a scheme to widen accessibility to the training-related information traditionally provided only to officials, such that team players, owners, fans, and the like may be granted access to review such materials.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIGS. 5A and 5B are workflow diagrams representing preferred aspects of operation for training officials according to the present invention.

DESCRIPTION OF THE INVENTION

Figure 1:
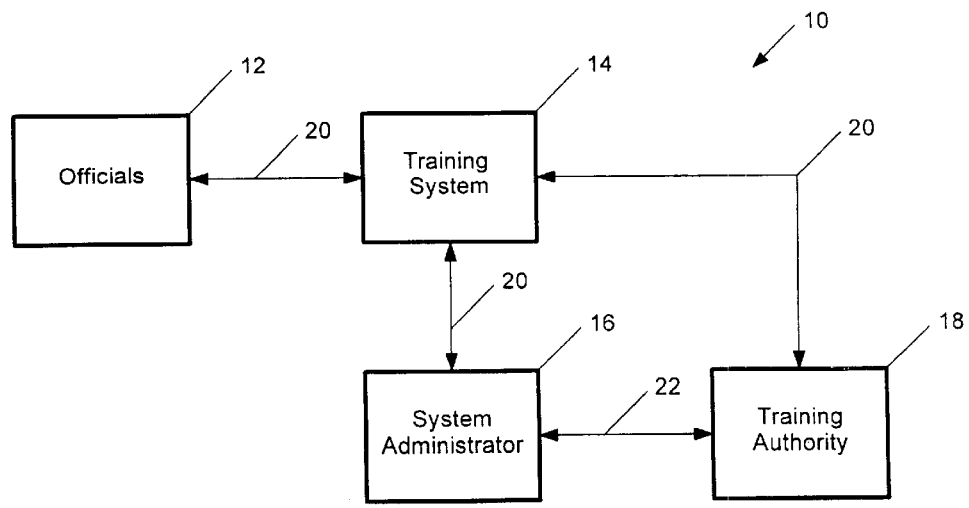
FIG. 1 is a simplified block diagram of the system of the present invention.

Referring now to the drawings, wherein like reference characters represent corresponding elements throughout the several views, and more specifically referring to FIG. 1, a multi-media network-based communication system ("system") 10 is shown employing the present inventive method to train a staff of officials 12 from a sports league. The system 10 establishes a framework to, among other things, provide training-related information from the league's training authority 18 to the officials 12, by way of a training system 14 run by a system administrator 16.

The training authority 18 is an individual or committee designated by the sports league to oversee certain aspects of the on-going training provided to the league's staff of officials 12. The sports league comprises a professional sports league, such as the National Basketball Association or National Football League ("NBA" or "NFL"), or an amateur league, such as the National Collegiate Athletic Association ("NCAA"). The system administrator 16 is an individual or group tasked by the league with establishing and operating the training system 14. The training authority 18 provides the system administrator 16 with training-related information, and appropriate instruction as to how it is to be incorporated into the training system 14 for use by the officials 12.

The training-related information is stored on an appropriate medium, such as a video tape having plays from league games which are selected by the training authority 18 for their training value. The training-related information may also include appropriate comments and/or questions for presentation with the plays on the training system 14, or any other information which the training authority 18 wants to disseminate to the officials 12. Such comments and/or questions are for review by an official 12 to describe, suggest, or evoke a lesson to be learned from their review of instructive game segments (e.g., plays) selected by the training authority 18 for review. The training-related information is submitted to the system administrator 16 over a suitable communication link 22, which may include mailing of the video tapes and other information for circulation to the officials 12.

Preferably, the system 10 runs on the Internet, with the system administrator 16 establishing and operating a Web site ("site") incorporating the system's underlying method, which along with the training-related information is uploaded to the training system 14 in a conventional manner over a communication link 20. The officials 12 access the site via their respective Internet service providers ("ISPs") over a suitable communication link 20. Similarly, the training authority 18 may access the site using their ISP over a communication link 20.

Figure 2:
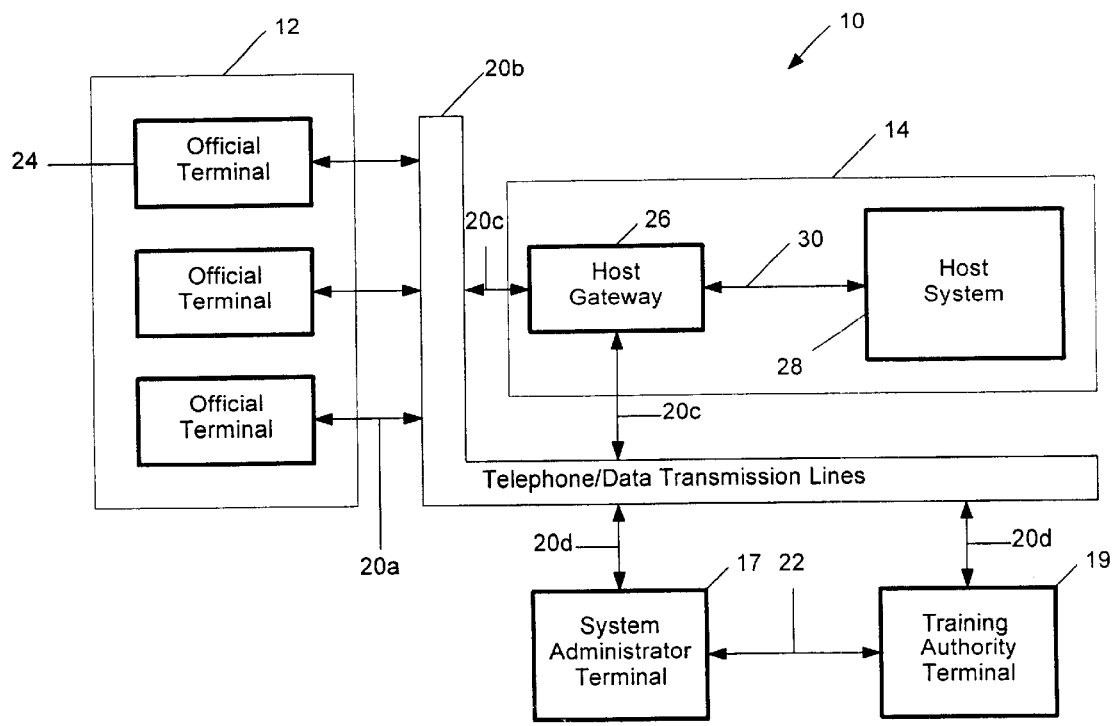
FIG. 2 is a block diagram of the primary elements of the system of FIG. 1.

Referring to FIG. 2, a block diagram is shown representing the primary elements of the system 10 of FIG. 1. The training system 14 includes a host system 28 connected with a host gateway 26 thru a communication link 30. The host gateway 26 is connected to each official's terminal 24 by way of communication links 20a and 20c and data bus 20b. Similarly, connection between the host gateway 26 and the system administrator and training authority terminals 17, 19 is made by communication links 20c and 20d and data bus 20b. The host system 28 provides the desired site, and the host gateway 26 interfaces with the host system 28 using a protocol understood by the remote terminals 17, 19, and 24. On the Internet, for example, transmission control protocol/internet protocol (TCP/IP) is frequently employed.

Employing terminal 17, the system administrator 16 accesses and provides the host system 28 with appropriate instructions to have the desired site hosted thereon.

Additionally, the system administrator 16 may use terminal 17 (and/or other conventional input devices) to periodically update the site to include the training-related and other information provided by the training authority 18 for dissemination to the officials 12.

The site provides a "home page" remotely accessible to the officials 12, the training authority 18, and the system administrator 16. The home page provides the necessary instructions and links for the officials 12 to review the posted training-related information, to provide feedback to the training authority 18 following review of the posted information, and to perform other desired tasks. Additionally, the home page includes suitable instructions and links for the training authority 18 to communicate with the officials 12, as needed. Of course, it will be understood by those skilled in the art that one or more home pages could be employed, where in the latter case, there would preferably be a separate home page for the officials 12 and the training authority 18.

With the system 10 according to the present invention, the officials 12, the training authority 18, and the system administrator 16 can gain access over communication links 20 (e.g., telephone and/or other data transmission lines) to the host system 28 by contacting the host gateway 26. As is known in the art, this contact can be established on a network such as the Internet by sending data packets to an electronic address associated with the site provided by the host system 28.

Figure 3:
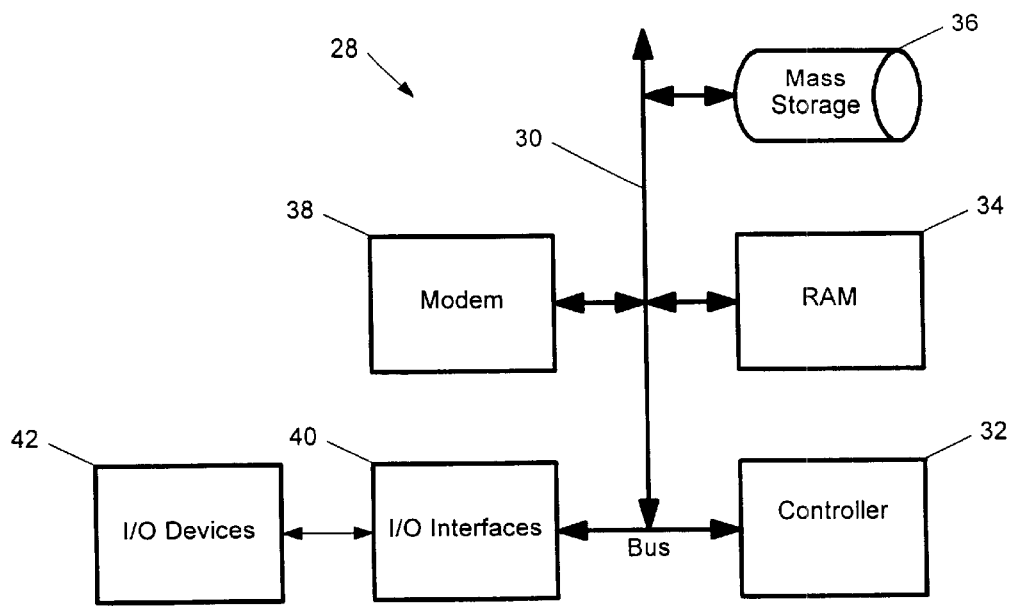
FIG. 3 is a block diagram of the host system of FIG. 2.

Referring to FIG. 3, a block diagram illustrates in more detail the host system 28 of FIG. 2. As shown, a controller 32 comprising a central processing unit ("CPU") and associated read only memory ("ROM") is connected along data and address bus line 30 to a random access memory (RAM) 34. Also connected to the RAM 34 and the controller 32 is one or more mass storage devices 36. These components are operatively connected to input/output interface devices 40 which control various corresponding input/output devices 42. These input/output devices 42 may include such conventional elements as a keyboard, a mouse, a video display, a printer, a digitizer or scanner, and other input/output devices. The host system 28 also employs a modem 38 to exchange information with remote terminals 17, 19, and 24 over standard voice lines, though it is understood that other devices can be utilized to transfer data between the host system 28 and the various remote users of the system 10.

As is conventionally known in the art, the ROM provides software instructions to perform basic operations upon power up of the host system 28. Once the host system 28 receives these instructions, the CPU reads operating system instructions stored on disk to configure the system 10 and to permit execution of various applications programs. These applications programs permit the method of operation described below in connection with FIGS. 5A and 5B.

Figure 4:
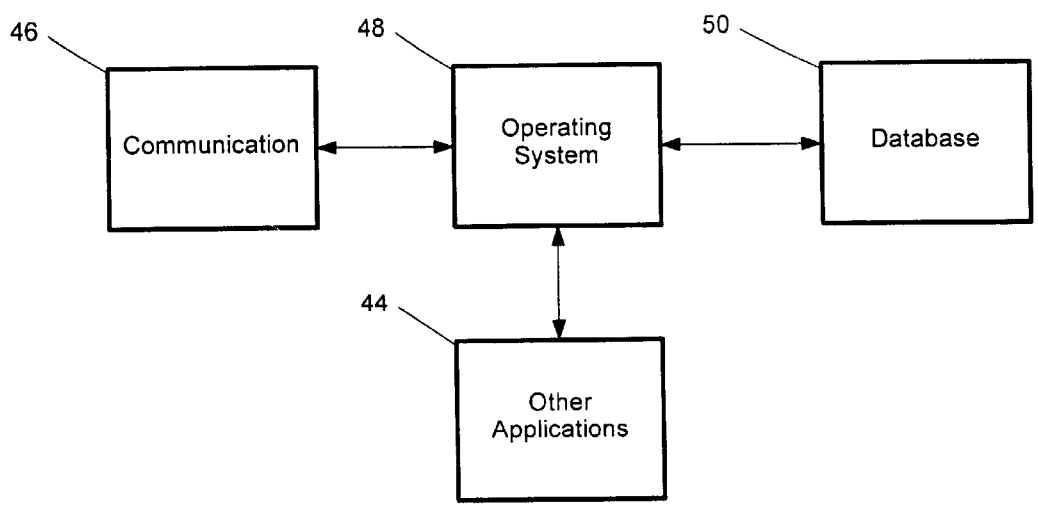
FIG. 4 is a block diagram of the software configuration for the host system.

FIG. 4 generally illustrates the software configuration of the host system 28. The host system 28 operates under control of a conventional operating system 48. The operating system 48 permits various conventional application processes to be executed. These include a communication application 46, a database application 50, and any other desired applications 44.

The communication application 46 permits data transfer with the officials 12, the training authority 18, and the system administrator 16. More precisely, the communication application 46 permits officials 12 to: log onto the site, review and provide feedback concerning the latest training submissions (e.g., video game clips), take tests or review rule clarifications provided by the training authority 18, and provide desired reports to the training authority 18. Such desired reports may include a game report in which an official summarizes certain aspects of a completed game, a travel expense report in which an official identifies travel-related expenditures, or any other report desired by the training authority 18. The communication application 46 also permits the training authority 18 to log onto the site and exchange communications with the various officials 12 or the system administrator 16. Similarly, the system administrator 16 may log onto the site to exchange communications with the officials 12 and/or the training authority 18.

The database application 50 organizes, stores, and retrieves the various training submissions for the officials 12. As noted, the training submissions are selected by the training authority 18, and provided to the system administrator 16 for putting in appropriate format for posting on the site. The training submissions typically include video clips depicting game plays having training value, and text which presents comments and/or questions about corresponding video clips. Additionally, training submissions may include tests for the officials 12 to take, or recent rule clarifications from the league. This information is organized and stored within the environment of the operating system 48 in one or more mass storage devices 36.

FIG. 5A is a workflow diagram representing one preferred aspect of operation for training officials 12 according to the present invention. Specifically, in step 52, one of the league games is played and televised over any conventional broadcast medium. In steps 54 and 56, the game's televised broadcast is received and recorded by the training authority 18 over a conventional television signal reception and recording system. The game recording is stored on any conventional storage medium, such as a video cassette recorder ("VCR") tape. In step 58, the training authority 18 reviews the game recording, and in step 60 identifies which, if any, of the game's plays are of training value for the officials 12. Plays of training value include those where, in the training authorities opinion: 1) an official's call was inaccurate; 2) a similar game situation has been dissimilarly officiated; 3) a player in violation of a game rule has discovered a way to avoid having a call made against them; 4) the subject game situation occurs infrequently or involves resolving complex game rules; or 5) the training authority 18 otherwise finds training value in the game segment.

Assuming that certain plays from the game have been selected for training use, the selected plays are now relayed to the system administrator 16 for posting on the site. In this regard, the training authority 18 may forward to the system administrator 16 a recording of the full game broadcast, along with instructions identifying the plays for posting on the site. Alternatively and preferably, the training authority 18 makes a recording of only the selected plays, and forwards the recording to the system administrator 16, along with instructions concerning how and when to post the selected plays on the site. Such instructions may include, among other things, the identification of comments and/or questions for the system administrator 16 to post with the selected plays, such comments and/or questions enhancing training value by appropriately focusing the officials' review of the selected plays.

It is understood that the selected-plays recording is stored on any conventional storage medium, such as a VCR tape, and is submitted to the system administrator 16 in any conventional manner, such as by mail or courier. However, those in the art understand that the selected-plays recording and related posting instructions may be appropriately formatted to send by conventional electronic transmission to the system administrator 16 for posting on the site. It is further understood that the selected-plays recording has thus far been described as containing plays from a single game, though such recording may include selected plays from a plurality of games, such as the league's games from the previous week.

For purposes of further description, assume that the training authority 18 provides the system administrator 16 with a VCR tape of selected plays from one or more league games, and with desired posting instructions. In step 62, the system administrator 16 digitizes the selected plays in a conventional manner. By way of example, the selected plays are captured using a VCR which plays the tape and runs the video output to a conventional desktop computer employing a DC1000 capture card, from Pinnacle Systems of Mountain View, Calif. The selected plays are encoded into the audio video interleave (AVI) format using a conventional video editing application, such as Premiere™ from Adobe Systems Inc. of San Jose, Calif. The AVI-formatted plays are converted to the motion picture experts group (MPEG) format using a conventional encoder, such as the LSX-MPEG encoder from Ligos Corp. of San Francisco, Calif. It is understood that the selected plays may be digitized to include audio, as well as video information.

In step 64, the MPEG files for the selected plays are conventionally loaded onto the host system 28 for posting on the site. Similarly, any comments and/or questions that the training authority 18 wants posted with the links to the selected-play MPEG files are also conventionally posted for viewing. In step 66, the officials 12 log onto the site using such conventional means as the entry of an assigned username and password.

Thereafter, the officials 12 review the comment and/or question related to a selected play that they wish to view. As noted, such comments and/or questions are reviewed by an official 12 to describe, suggest, or evoke a lesson to be learned from their review of a selected play. The officials 12 may review a comment and/or question before or after viewing the corresponding selected play, which is accessed by conventionally selecting the link to the appropriate MPEG file (e.g., by pointing and clicking with a mouse-driven pointer). It is also noted that the comment and/or question related to a particular selected play may prompt an official 12 for a response concerning their review of the selected play. Such a response may consist of a written and/or oral response appropriately formatted for electronic delivery to the training authority 18 over the site.

By way of example, a selected-play MPEG file may demonstrate a frequently occurring game activity, such as violation of the "three-second rule" in basketball. The training authority 18 may instruct the system administrator 16 to post with the link to the MPEG file a message directing the officials 12 to submit a ruling on the play. The training authority 18 may then review the officials' responses to the ruling request, and provide appropriate feedback over the site to the officials 12, collectively or individually. In this manner, the league's staff of officials 12 are trained to more consistently make the proper ruling.

FIG. 5B is a workflow diagram representing another preferred aspect of operation for training officials 12 according to the present invention. Specifically, the site may be used to post tests to evaluate the officials' knowledge of the game's rules, or to post a recent rule clarification that the training authority 18 wants disseminated to its staff of officials 12. Such tests are periodically assigned to the officials 12 (e.g., on a weekly or monthly basis). Rule clarifications are generally provided on an as-needed basis, for example, when in the training authorities opinion, a given rule has been incorrectly applied in games, and a rule clarification may improve officiating results.

In step 68, the training authority 18 creates the test or rule clarification. A test comprises a series of questions intended to measure the officials' knowledge of league rules, while a rule clarification consists of a description of the proper interpretation and/or application of a particular rule to game play. If in step 70, the training authority 18 is disseminating a test, then steps 72–76 are followed, while circulation of a rule clarification is handled by steps 78 and 80. In the former case, the test is posted on the site in step 72 by the system administrator 16. The officials 12 thereafter access the site to take the test in step 74, permitting the training authority 18 to use the site to review the completed tests and to post test results in step 76. In like manner, the system administrator 16 posts the rule clarification on the site in step 78, facilitating official review thereof in step 80.

It should be understood that the methods and apparatuses described above are only exemplary and do not limit the scope of the invention, and that various modifications could be made by those skilled in the art that would fall under the scope of the invention. For example, the site also provides a convenient mechanism for the officials 12 to submit certain reports required by the training authority 18, such as a game report, a travel expense report, etc. Moreover, while the site is primarily intended for use as a training tool for officials 12, it may also be used to train other league participants, such as players, coaches, team owners, and the like. If desired, the site could also be employed as a tool to educate sports fans in the general public about proper officiating of the game under league rules. Additionally, though the site is primarily employed to pass training-related information between the training authority 18 and the officials 12, the site also establishes a convenient electronic bulletin board for the officials 12, or any site-users, to exchange ideas.

It is also noted that the system administrator 16 may log onto and operate the site from any terminal, not simply terminal 17 as shown in FIG. 2. For example, the system administrator 16 may operate the site from the training authorities terminal 19 or from a terminal comprising one of the host system's I/O devices 42 from FIG. 3.

It is further noted that while the comments and/or questions provided with selected game segments are typically provided in text form for visual review by the officials 12, they could just as well be provided in audio form. Similarly, responses to such comments and/or questions provided to the training authority 18 by the officials 12 could be in either text-based or audio form.

To apprise the public of the scope of this invention, the following claims are provided:

1. A method for training a staff of officials from a sports league by employing a computer system to provide a site on a network which includes training-related information posted on the site for review by the officials over remote computer terminals, comprising:
 a) receiving over a television signal reception system a televised broadcast of a game played under league rules;
 b) recording the broadcasted game on a storage medium;
 c) reviewing the recording of the broadcasted game;
 d) selecting from the reviewing of the broadcasted game one or more game segments that a training authority finds as valuable for training the officials;
 e) employing the computer system to digitize the selected game segments into a form for access over the site;
 f) employing the computer system to store the digitized game segments in a database linked to the site; and
 g) employing the computer system to post a link on the site for each digitized game segment stored in the database, each link when chosen by an official over a remote computer terminal calling up from the database for review by the official the stored representation of the corresponding digitized game segment.

2. The method of claim 1 wherein a valuable game segment demonstrates at least one of the following, according to the training authority: an official's call that is inaccurate, a similar game situation that is dissimilarly officiated, a technique that a player in violation of a game rule uses to avoid having an official render a call against them, a game situation which occurs infrequently or involves resolving complex game rules.

3. The method of claim 1 wherein the digitized game segments comprise one of video and audio-video files for the selected game segments.

4. The method of claim 1 wherein the digitized game segments are posted on the site from a plurality of games that are played during the sports league season.

5. The method of claim 4 wherein at least some of the officials travel between different sports venues to officiate games, accessing the site between games to review digitized game segments from prior games.

6. The method of claim 1 further including the posting on the site of a comment from the training authority, each comment providing a training-related observation concerning a related digitized game segment.

7. The method of claim 1 further including the posting on the site of a question from the training authority, each question providing a training-related inquiry concerning a related digitized game segment.

8. The method of claim 1 further comprising:
 a) preparing for the officials a test concerning league rules;
 b) posting on the site an electronic form comprising the test for the officials to take;
 c) receiving completed tests on the site from the officials; and
 d) posting test results on the site.

9. The method of claim 1 further comprising:
 a) furnishing a rule clarification concerning a league rule; and
 b) posting the rule clarification on the site.

10. The method of claim 1 wherein the sports league is one of a professional and an amateur sports league.

11. The method of claim 1 wherein the network comprises the Internet.

12. The method of claim 1 wherein the site establishes a communication link between any two members of the group consisting of: the officials, the training authority, players of the sport, owners of the league teams, administrators of the league teams, and sports fans.

13. The method of claim 1 further comprising the posting on the site of electronic forms for receiving from the officials reports required by the training authority which relate to one of a summary of an officiated game and a travel expense report.

14. A method of providing instruction to facilitate more consistent and correct officiating of games played under defined rules of a sports league comprising:

a) providing a site on a network establishing a communication link between those with interest in the instruction;

b) selecting from a game one or more game segments demonstrative of a call made by one or more game officials that has training value;

c) digitizing the selected game segments into a form for posting on the site; and d) posting for review on the site the digitized game segments, each digitized game segment being linked to one of a displayed comment and question at least suggestive of an instructional point demonstrated by the corresponding digitized game segment.

15. A system facilitating more consistent and correct officiating of games played under defined rules of a sports league, wherein the officiating is performed by a staff of league officials, at least some of which travel between different sports venues to officiate the games, comprising:

a) a site on a network accessible to the staff of officials between the games to review training-related information posted on the site from prior games;

b) a series of digitized game segments posted on the site, each digitized game segment comprising a video segment from a prior game that demonstrates game action having a call under the rules made by one or more game officials; and c) a series of comments and questions posted on the site, each comment and question being at least suggestive of a lesson demonstrated by the training-related information from a corresponding digitized game segment.

* * * * *